US010578708B2

(12) United States Patent
Evangelista et al.

(10) Patent No.: US 10,578,708 B2
(45) Date of Patent: Mar. 3, 2020

(54) SWITCHABLE TRANSMIT/RECEIVE (T/R) MODULE

(71) Applicant: Raytheon Company, Waltham, MA (US)

(72) Inventors: Steven C. Evangelista, Northborough, MA (US); Christopher M. Laighton, Boxborough, MA (US); Anthony J. Silva, Reading, MA (US)

(73) Assignee: Raytheon Company, Waltham, MA (US)

( * ) Notice: Subject to any disclaimer, the term of this patent is extended or adjusted under 35 U.S.C. 154(b) by 615 days.

(21) Appl. No.: 15/094,439

(22) Filed: Apr. 8, 2016

(65) Prior Publication Data

US 2017/0293017 A1    Oct. 12, 2017

(51) Int. Cl.
*G01S 7/03*    (2006.01)

(52) U.S. Cl.
CPC .............. *G01S 7/034* (2013.01); *G01S 7/032* (2013.01)

(58) Field of Classification Search
None
See application file for complete search history.

(56) References Cited

U.S. PATENT DOCUMENTS

| 5,554,865 | A  * | 9/1996 | Larson ..................... G01S 7/034 257/194 |
| 6,879,817 | B1 * | 4/2005 | Sorrells .................... H03C 3/40 455/207 |
| 9,409,151 | B1 * | 8/2016 | West ....................... B01J 23/005 |
| 9,455,700 | B1 * | 9/2016 | Xiao ......................... H04B 1/44 |
| 2004/0235426 | A1 | 11/2004 | Pozgay et al. |
| 2009/0237173 | A1 | 9/2009 | Ziaei |
| 2014/0038529 | A1 | 2/2014 | Adlerstein |
| 2015/0188592 | A1 * | 7/2015 | Solondz .............. H04B 1/3888 455/501 |
| 2015/0326326 | A1 * | 11/2015 | Nobbe ................... H04B 17/12 375/224 |
| 2016/0142095 | A1 * | 5/2016 | Pos ....................... H01Q 21/30 455/78 |

FOREIGN PATENT DOCUMENTS

| CN | 204314454 U | 5/2015 |
| EP | 0 987 560 A1 | 3/2000 |
| JP | 2010-175333 A | 8/2010 |

(Continued)

OTHER PUBLICATIONS

Notification of Transmittal of the International Search Report and the Written Opinion of the International Searching Authority, or the Declaration, PCT/US2017/025696, dated Jun. 21, 2017, 1 page.

(Continued)

*Primary Examiner* — Vladimir Magloire
*Assistant Examiner* — Donald H B Braswell
(74) *Attorney, Agent, or Firm* — Daly, Crowley, Mofford & Durkee, LLP

(57) ABSTRACT

A transmit/receive module having a switch, a load and a controller for coupling radar energy fed to switch to the load during a time interval subsequent to the controller producing a transmit enable signal to the transmit/receive module and prior to the controller producing a receive enable signal to the transmit/receive module.

8 Claims, 12 Drawing Sheets

(56) References Cited

FOREIGN PATENT DOCUMENTS

TW          201547184 A      12/2015
WO    WO 2015/069375 A1      5/2015

OTHER PUBLICATIONS

International Search Report, PCT/US2017/025696, dated Jun. 21, 2017, 5 pages.
Written Opinion of the International Searching Authority, PCT/US2017/025696, dated Jun. 21, 2017, 9 pages.
Taiwanese Office Action Including Search Report (with English Abstract and English Machine Translation) dated Mar. 6, 2018 for Taiwanese Application No. 106111570; 13 Pages.
Notification concerning Transmittal of the International Preliminary Report on Patentability dated Oct. 18, 2018 for International Application No. PCT/US2017/025696; 1 Page.
International Preliminary Report on Patentability dated Oct. 18, 2018 for International Application No. PCT/US2017/025696; 1 Page.
Written Opinion of the International Searching Authority dated Oct. 18, 2018 for International Application No. PCT/US2017/025696; 7 Pages.

\* cited by examiner

| GaAs Module Truth Table | | |
|---|---|---|
| Receive Enable | Transmit Enable | RF Switch Position |
| 0 | 0 | Last State |
| 0 | 1 | Transmit |
| 1 | 0 | Receive |
| 1 | 1 | Not Allowed |

*FIG. 1C*
PRIOR ART

| GaN Module Truth Table | | |
|---|---|---|
| Receive Enable | Transmit Enable | RF Switch Position |
| 0 | 0 | Terminated |
| 0 | 1 | Transmit |
| 1 | 0 | Receive |
| 1 | 1 | Not Allowed |

*FIG. 4*

SWITCHABLE TRANSMIT/RECEIVE (T/R) MODULE

TECHNICAL FIELD

This disclosure relates generally to switchable transmit/receive (T/R) modules and more particularly to T/R modules having Gallium Nitride (GaN) High Power Amplifier (HPA) Field Effect Transistors (FETs).

BACKGROUND

As is known in the art, a switchable transmit/receive (T/R) module is used in many radar system applications to direct a radar signal produced by a radar transmitter and fed to an antenna during a transmit mode and to direct radar returns received by the antenna to a radar receiver during a subsequent receive mode selectively in response to electronic logic control signals fed to switches used in the T/R module. More particularly, referring to FIG. 1, a radar system is shown having beam forming apparatus to form beams of electromagnetic radiation. The shape of the beam is related to the phase and amplitude distributions provided to signals received or transmitted across an aperture of the apparatus. For example, in a phased array antenna, as shown in FIG. 1, the aperture includes a plurality of antenna elements. Each one of the antenna elements is coupled to a feed network through a corresponding one of a plurality of switchable transmit/receive (T/R) modules. Each one of the plurality of switchable transmit/receive (T/R) modules includes a variable phase shifter and variable gain/attenuation element. The feed structure may be a corporate feed or may be through illuminations as in a space fed phased array system. In any event, the modules are controlled by signals from a beam steering computer to provide a collimated and directed beam of radiation. For example, for a broadside (i.e., boresight) beam the phase shift of the signals emanating from each antenna element is zero relative to some arbitrary reference. If the phase shift from element to element are in-phase, the direction of the main radiation lobe is shifted from broadside accordingly.

Each one of the switchable transmit/receive (T/R) module includes: set of three T/R switches controlled by logic signals produced a CLC control interface (or control logic) in response to transmit enable and receive enable signals produced by a system controller; a digitally controlled attenuator and digitally controlled phase shifter, controlled by signals fed by the beam steering computer, a high power amplifier (HPA); a circulator and a low noise amplifier LNA, arranged as shown. During transmit, RF energy from the radar system is fed to the plurality of antenna elements through the feed network, the switchable transmit/receive (T/R) modules, the high power amplifiers (HPA), and the circulator. On receive, energy received by the antenna elements is fed to the radar system through the circulator, low noise amplifier LNA, the switchable transmit/receive (T/R) module, and feed network.

One such T/R module, a Common Leg Circuit (CLC) wherein both the transmit signal and the return signals pass between an antenna and circulator to the radar system through common gain controlled attenuators and phase shifters is shown in FIGS. 1A and 1B; FIG. 1A showing schematically the position of the three T/R switches, each including a pair of Field Effect Transistors (FETs; FET 1 and FET 2) as shown in the transmit mode and FIG. 1B showing schematically the position of the three T/R switches used in the switchable transmit/receive (T/R) module in the receive mode. The FETs 1 and 2 in each one of the T/R switches is controlled by control signals (logic signals) produced by control logic to be described below, in response to transmit enable and receive enable logic signals produced by the system controller (FIG. 1).

As is also known in the art, in the ability to switch between transmit and receive modes quickly enables higher performance for the radar system. In traditional Gallium Arsenide (GaAs) High Power Amplifier (HPA) based radar applications, the common source FET is used as the HPA. In the transmit mode this HPA FET is shutdown very quickly since its drain voltage decays very fast. More particularly, FIG. 1C is a truth table showing the relationship between the logic signals produced by the control logic in response to the transmit enable and receive enable signals produced by the system controller and FIG. 1D shows timing diagrams for a repetitive sequence of transmit/receive modes of operation. It is first noted that the control logic section includes a pair of NOR gates; NOR gate 1 and NOR gate 2 arranged to provide a "flip/flop" circuit.

Thus, assume that a transmit enable logic 1 signal is applied to NOR gate 1 and that a receive enable logic 0 signal had been fed to NOR gate 2; therefore, the logic 1 fed to NOR gate 1 produces a logic 0 fed to the gates of the three FETs 1 turns the three FETs 1 "off" while the NOR gate 2 produces a logic 1 fed to the gate of the three FETs 2 turning the three FETs 2 "on" so that RF passes from the beam forming network to the antenna, as indicated by the arrow in FIG. 1A.

After the transmit enable logic 1 is removed, or changed from a logic 1 to a logic 0, to wait for a subsequent receive mode, the logic 0 remains on the receive enable, so that NOR gate 1 still produces a logic 0, a logic 1 is still produced by NOR gate 2 and the three FETs 1 continue to stay "off" and the three FETS 2 remain "on", so the transmit mode is maintained.

When a receive enable logic 1 is subsequently received, it being noted that the transmit enable logic 1 had been removed, or changed from a logic 1 to a logic 0, to wait for a subsequent receive mode, the receive enable logic 1 turns the three FETS 1 "on' and the three FETs 2 "off" whereby RF received by the antenna passes to the beam forming network as illustrated by the arrow in FIG. 1B. It is noted that the system remains in the receive mode even after the receive enable signal switches from a logic 1 to a logic 0 because the logic 0 on the transmit enable is fed as a logic 1 input to NOR gate 2 which produces a logic 0 on the three FETs 2.

It is also noted that the radar needs the transmit elements to be turned all the way off before the radar system can switch into the receive mode. Due to this, traditional systems Gallium Arsenide (GaAs) FET switches were able to keep a last state logic level sent to the RF routing switches for low logic levels at both Transmit and Receive enable. The transmit path is enabled in the dwell between transmit pulses and receive returns, but the drain voltage on the HPA FETs drops quickly enough that no RF energy is generated by the transmit chain of GaAs power amplifiers.

In Gallium Nitride (GaN) MMIC based radars this becomes difficult because the impedance of the GaN HPA FET causes a slow decay of the drain voltage when the transmit mode is turned off (terminated or shutdown). This slow decay causes a delay before the receive mode can be turned on. However, for GaN based High Power Amplifiers (HPAs) that are used in more modem transmit/receive modules, a bleeder circuit is sometimes used to drain the voltage quickly but is not practical for a CLC.

SUMMARY

In accordance with the present disclosure, a transmit/receive module is provided having: a switch; a load; and a controller for coupling radar energy fed to switch to the load during a time interval subsequent to the controller producing a transmit enable signal to the transmit/receive module and prior to the controller producing a receive enable signal to the transmit/receive module.

In one embodiment, a transmit/receive module is provided, comprising: a first switch; a second switch; a third switch; a load; and a controller. The controller produces transmit enable signal and a subsequent enable signal for the switches to operating the first switch, the second switch and the third switch to: couple radar energy from a transmitter/receiver section of a radar system through the first switch, then to the third switch, then to the second switch and then to an antenna in response to a transmit enable signal fed to the first switch, the second switch, and the third switch to initiate a transmit mode; couple radar signals received by the antenna through the third switch, then to the second switch, then to the first switch and then to the transmitter/receiver section of the radar system in response a receive enable signal fed to the first switch, the second switch, and the third switch to initiate a receive mode; and, couple radar energy fed to the first switch to a load during a time interval subsequent to the transmit enable signal and prior to the receive enable signal inhibiting the energy fed to the first switch to the second switch.

In one embodiment, a transmit/receive module is provided, comprising: a controllable attenuator; a controllable phase shifter serially coupled to the controllable attenuator; a plurality of switches; and a controller for producing a transmit enable signal and a subsequent receive enable signal for the plurality of switches to: couple radar energy from a transmitter/receiver section of a radar system through a first one of the plurality of switches, then to a third one of three plurality of switches, then through the serially coupled controllable attenuator and controllable phase shifter, then to a second one of the plurality of switches and then to an antenna in response to the transmit enable signal fed to the plurality of switches to initiate a transmit mode; couple radar signals received by the antenna through the third one of the plurality of switches, then through the serially coupled controllable attenuator and controllable phase shifter, then to the second one of the plurality of switches, then to the first one of the plurality of switches and then to the transmitter/receiver section of the radar system in response the receive enable signal fed to the plurality of switches to initiate a receive mode; and, couple radar energy fed to the first one of the plurality of switches to a load during a time interval subsequent to the transmit enable signal and prior to the receive enable signal inhibiting the energy fed to the first one of the plurality of switches from passing to the serially coupled controllable attenuator and controllable phase shifter.

In one embodiment, the first one of the plurality of switches has a predetermined input impedance when responding to the transmit enable signal and wherein the load has the same impedance as the predetermined input impedance.

With such a transmit/receive module, the first switch is a common RF port switch purposely terminated into a matched load when the transmit and receive enables are both in a off or low state (that is between the time the transmit enable signal has terminated and before the subsequent receive enable signal is initiated. This shuts off the path for the transmit mode to produce RF energy while the drain voltage on the transmit chain of GaN power amplifiers decays. This allows the receive mode to be turned on quicker and therefore improve the capabilities of the overall radar system. In other words, the dwell time between transmit and receive mode can be greatly reduced.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

FIG. 1C is a truth table used in the operation of the switchable T/R module of the radar system of FIG. 1 according to the PRIOR ART;

FIG. 4 is a truth table used in the operation of the switchable T/R module of FIG. 3 according to the disclosure;

Like reference symbols in the various drawings indicate like elements.

DETAILED DESCRIPTION

Figure 3:
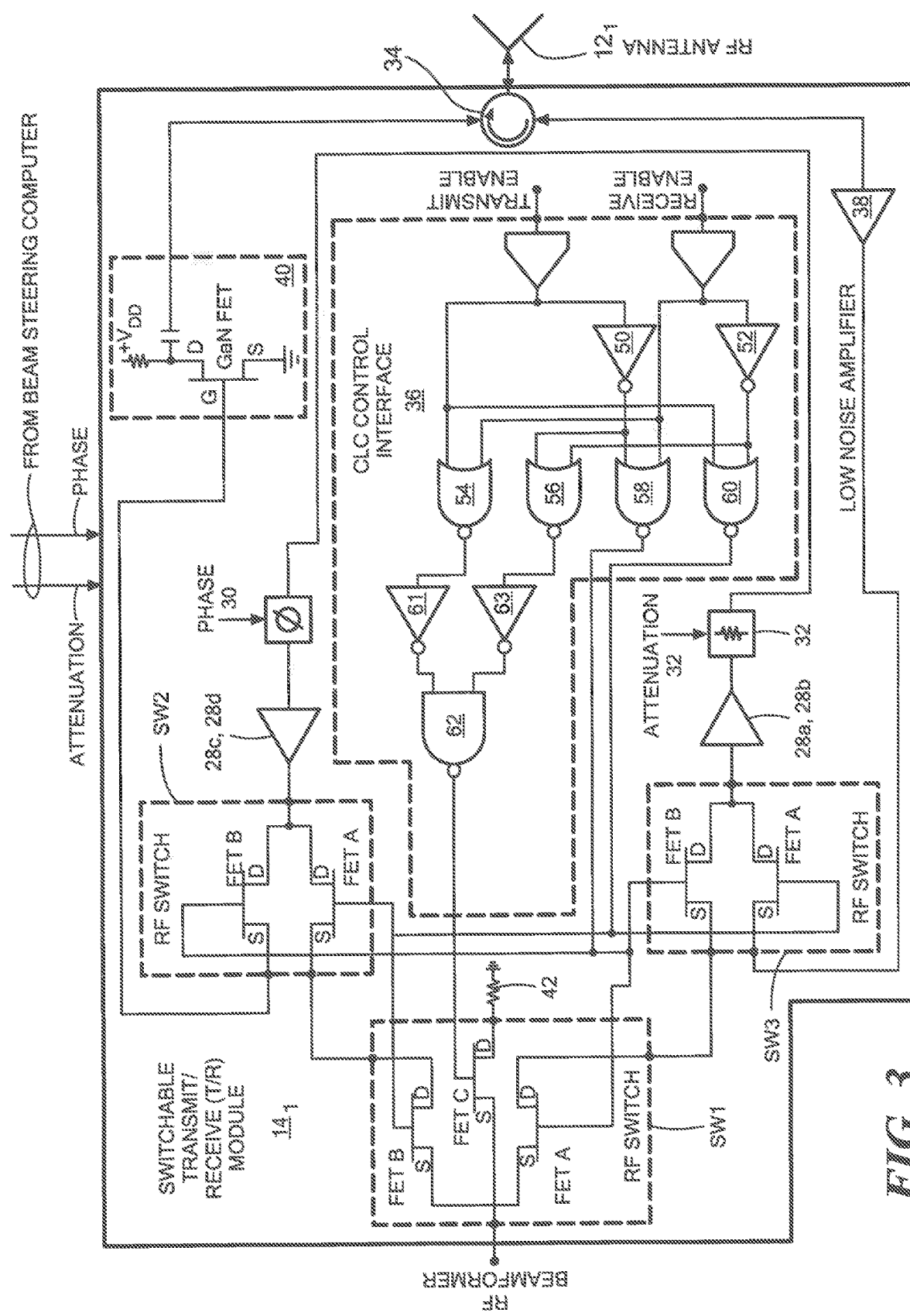
FIG. 3 is block diagram one of the switchable transmit/receive (T/R) modules used in the radar system of FIG. 2 according to the disclosure.

Referring now to FIG. 3, a radar system 10 is shown. Here the radar system 10 is a phased array radar system having: an array of, n, antenna elements $12_1$-$12_n$, where n is an integer greater than one. Each one of the n antenna elements is coupled to a corresponding one of a plurality of, n, identical switchable transmit/receive (T/R) modules $14_1$-$14_n$, an exemplary one thereof, here module $12_1$ being shown in more detail. The n switchable transmit/receive (T/R) modules $14_1$-$14_n$ is coupled to a transmit/receive section 16 through a feed network 18, as indicated. A beam steering computer 20 is provided to produce sets of phase and attenuation signals to the each one of the n switchable transmit/receive (T/R) modules $14_1$-$14_n$, and thereby produce collimated and directed beams of radiation during both a transmit mode or a subsequent receive mode. The transmit mode or receive node is selected in response to a transmit enable or a receive enable signal, respectively, produced for the n switchable transmit/receive (T/R) modules $14_1$-$14_n$, by a system controller 22.

Figure 2:
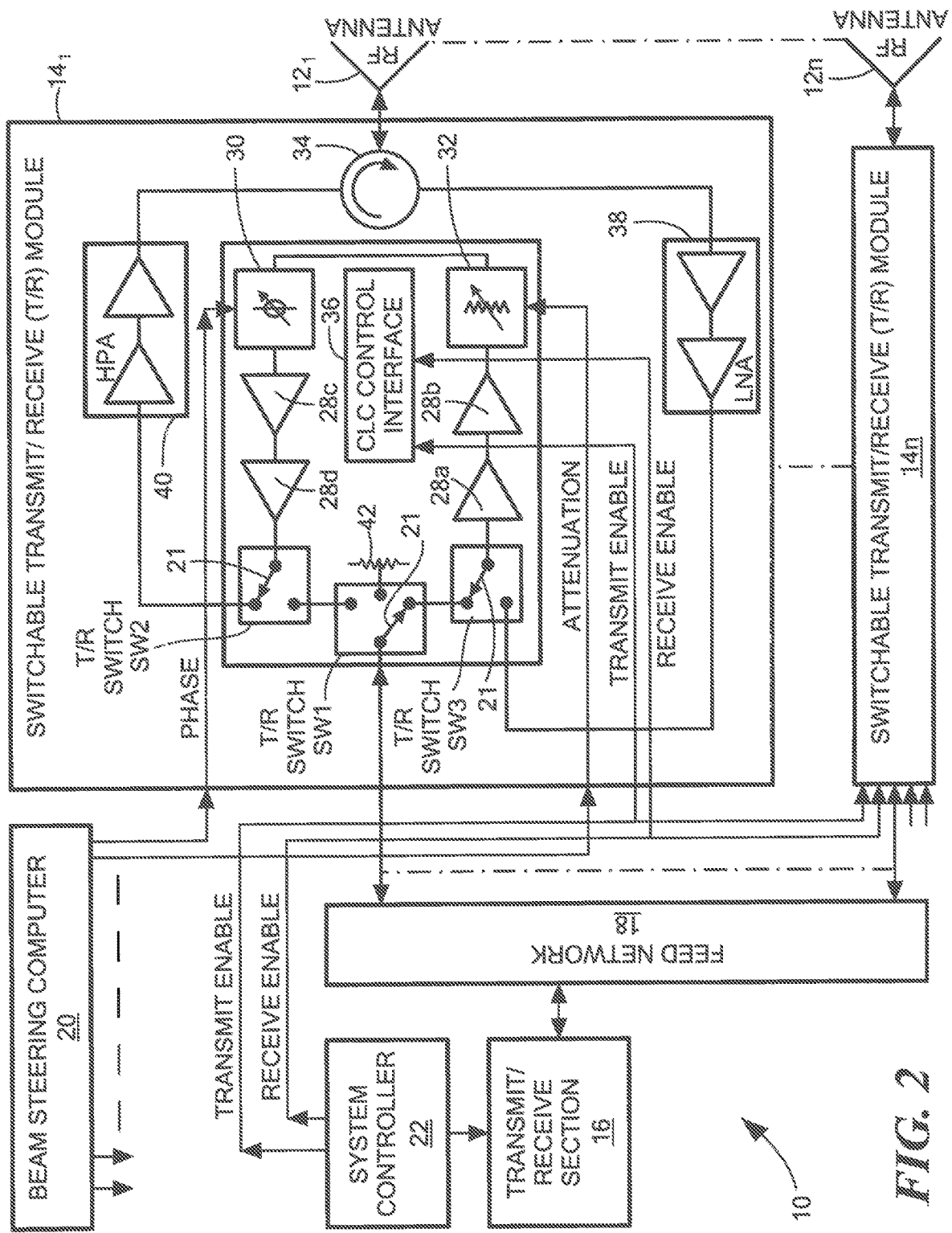
FIG. 2 is block diagram of a radar system having switchable transmit/receive (T/R) modules according to the disclosure.
Figure 3A:
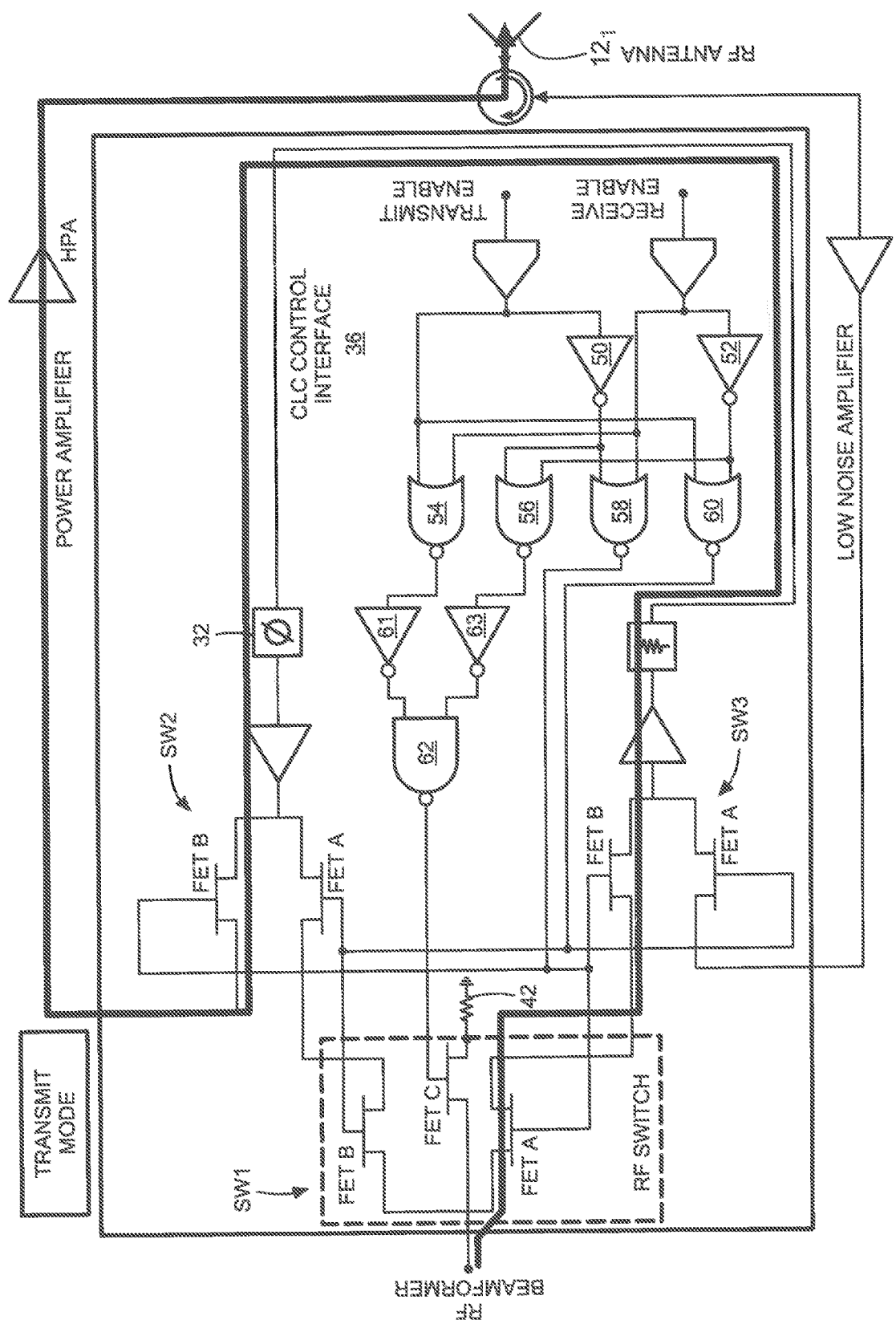
FIG. 3A is a diagrammatical sketch of the switchable T/R module of FIG. 2 operating in the transmit mode in response to a transmit enable signal according to the disclosure.
Figure 3B:
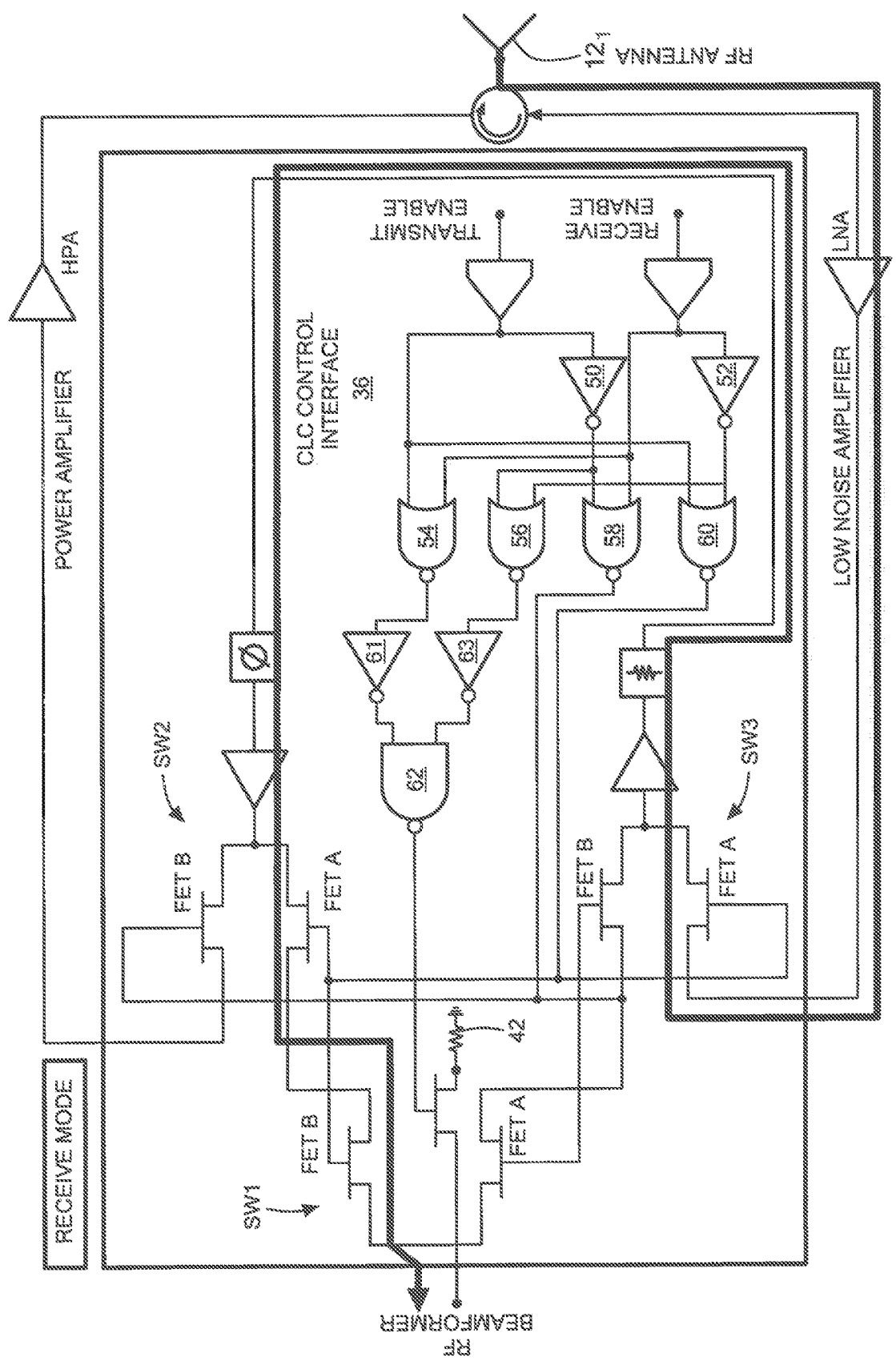
FIG. 3B is a diagrammatical sketch of a switchable T/R module used in the radar system of FIG. 1 operating in the receive mode in response to a receive enable signal according to the disclosure.

Each one of the switchable transmit/receive (T/R) module $14_1$-$14_n$ includes: a set of three T/R switches SW1, SW2, and SW3, here GaAs FETs, and as shown for exemplary switchable transmit/receive (T/R) module $14_1$; an amplifier section having a first pair of GaAs amplifiers 28a, 28b, a digitally controlled phase shifter 30, controlled by phase signals produce by the beam steering computer 20; a digitally controlled attenuator 32 controlled by attenuation signals produced by the beam steering computer 20; second pair of GaAs amplifiers 28c, 28d; a circulator 34, coupled to antenna element $12_1$; a CLC control interface 36, here for example GaN or GaAs, responsive to the transmit enable and receive enable signals produced by the system controller 22 for producing logic signals for the three T/R switches SW1, SW2, and SW3 in a manner to be described in more detail in connection with FIGS. 3A and 3B; a low noise amplifier (LNA) section 38 and a high power amplifier (HPA) section 40, arranged as shown. The HPA section 40 is GaN technology and includes a common (grounded) source electrode (S) connected GaN FET having a drain electrode (D) connected to +$V_{DD}$, with the gate electrode (G) fed by the T/R switch SW 2 of the common source electrode (S) connected GaN FET, as shown. It is noted that the position of the three T/R switches SW1, SW2, and SW3 in FIG. 3 are shown in the transmit mode, (i.e., the switch "blades" 21 (FIG. 2) are illustrated to the down position) so that RF energy from the feed network 18 passes from SW 1 to SW 3, through the second pair of GaAs amplifiers 28a, 28b, through attenuator 32 to phase shifter 30 through SW 2 to the HPA section 40 to circulator 34 and finally to antenna element $12_1$. In the receive mode, the position of the "blades 21" of the three T/R switches SW1, SW2, and SW3 in FIG. 3 would be in the up position so that RF energy received by the antenna $12_1$ would pass through the circulator 34 to the LNA section 38, to SW 3, through first pair of GaAs amplifiers 28a, 28b to the variable attenuator 32, to the digital phase shifter 30 through SW2 to SW 1 to the feed network 18. Here, between the transmit mode and the receive mode, when both the transmit enable and receive enable logic signals produced by the system controller 22 are both logic 0, the CLC control interface 36 produces logic signals for SW 1 to operate SW 1 to couple power dissipating load 42 to the feed network 18. Thus, it is noted that switch SW 1 can be considered as and common RF switch since it is conned to the RF beam forming network 18 (FIG. 2) during both the transmit mode and the receive mode. It is also noted that the input impedance to the switch SW 1 from the beam forming network 18 during transmit mode is a predetermined input impedance, here for example 50 ohm. Here, the load 42 has an impedance matched to the input impedance of the switch SW 1, and therefore is here 50 ohms. That is, the switch SW 1 is terminated in a power dissipating, impedance matched load 42.

More particularly, as will be described in more detail in connection with FIGS. 3A and 3B, each one of the switches SW 1, SW 2, and SW 3 includes FET switches, here Gallium Arsenide (GaAs) FET switches. Thus, while the GaN High Power Amplifier's (HPS) 40 causes a slow decay of the drain voltage when the transmit mode is turned off (terminated or shutdown); here by having switch SW 1 include an RF port purposely terminated into a matched load 42 when the transmit and receive enables are both in a low state, logic 0 state, the effect is to shut off the path for the transmit mode to produce RF energy while the drain voltage of the FET decays on the GaN high power amplifier (HPA) 40. This allows the receive mode to be turned on quicker and therefore improve the capabilities of the overall radar system. In other words, the dwell time between transmit and receive mode can be greatly reduced.

Referring now to FIG. 3, the exemplary switchable transmit/receive (T/R) module $14_1$ is shown in more detail. It is noted that switch SW 1 has three FETs; FET A, FET B and FET C. The source electrodes of the three FETS (FET A, FET B and FET C) of SW 1 are connected to the feed network 18 (FIG. 3); the gate electrodes of the three FETs are fed by control signals to be described; the drain electrode of FET A of SW 1 is connected to the source electrode of FET B of SW 3; the drain electrode of FET B of SW 1 is connected to the source electrode of FET A of SW 2, as shown; and the drain electrode of FET C of SW 1 in connected to ground through the match load 42, as shown.

Switch SW 2 has two FETs, FET A and FET B. FET A of SW 2 has its drain electrode connected to the drain electrode of FET B of SW 2 and to the output of amplifier 28d, as shown. The source electrode of FET B of SW 2 is connected to the input of HPA 40, as shown.

Switch SW 3 has two FETs, FET A and FET B. FET A of SW 3 has its drain electrode connected to the drain electrode of FET B of SW 3 and to the input of amplifier 28a as shown. The source electrode of FET A of SW 3 is connected to the output of LNA 38, as shown.

The CLC interface 36 to include: inverters 50, 52, 61 and 63; NOR gates 54, 56, 58, and 60; and NAND gate 62, all arranged as shown. The output of NAND gate 62 provides the control signal for the gate electrode of FET C of switch SW 1; the output of NOR gate 58 provides the control signal for FET A of switch SW 1, and FET B of switches SW 2 and SW 3; and, the output of NOR gate 60 provides the control signal for FET B of switch SW 1 and for FETS A of switches SW 2 and SW 3. The truth table for the CLC interface 36 is shown in FIG. 4 and the timing diagram is shown in FIG. 5.

Figure 1:
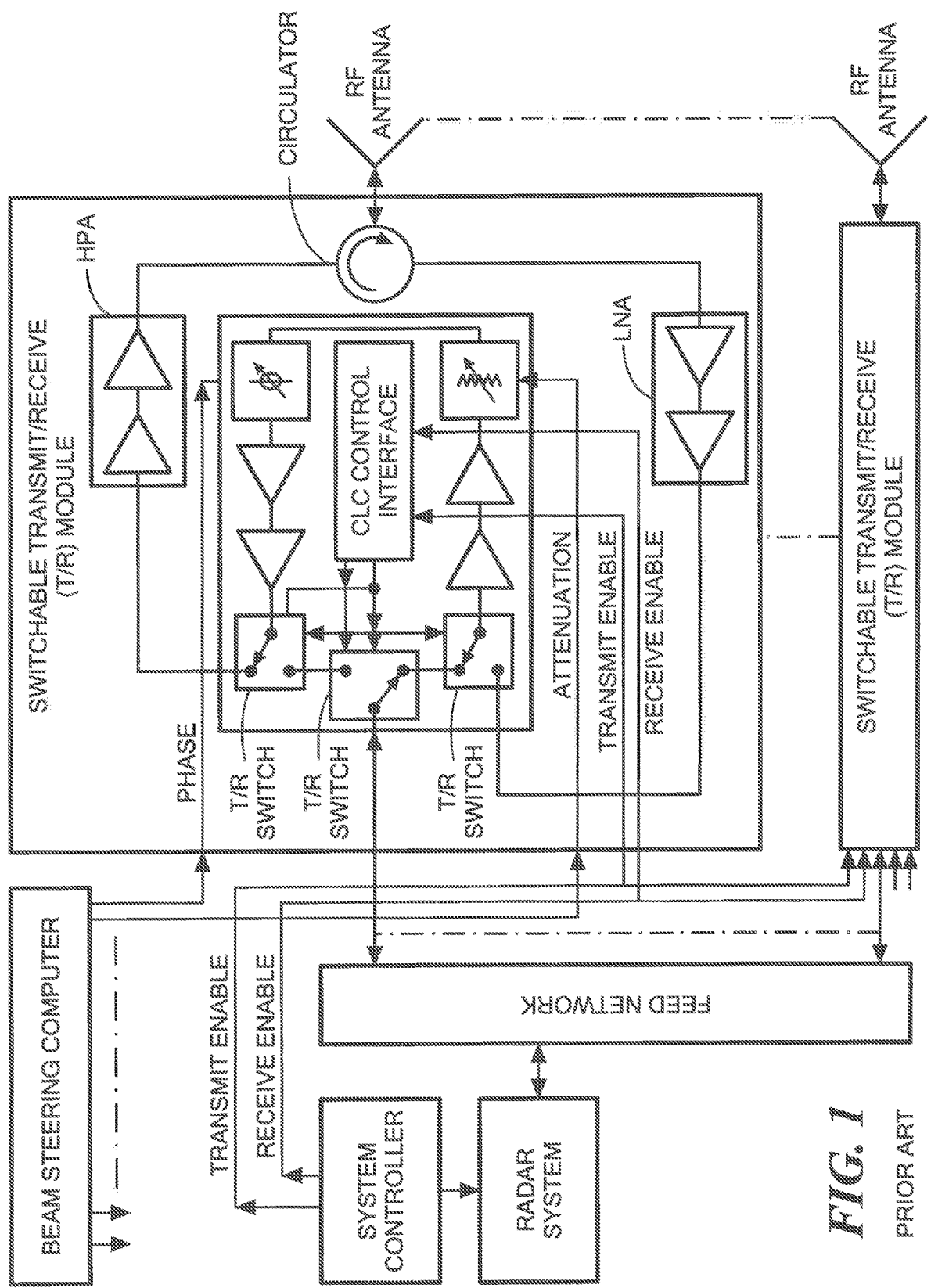
FIG. 1 is block diagram of a radar system having switchable transmit/receive (T/R) modules according to the PRIOR ART.
Figure 1A:
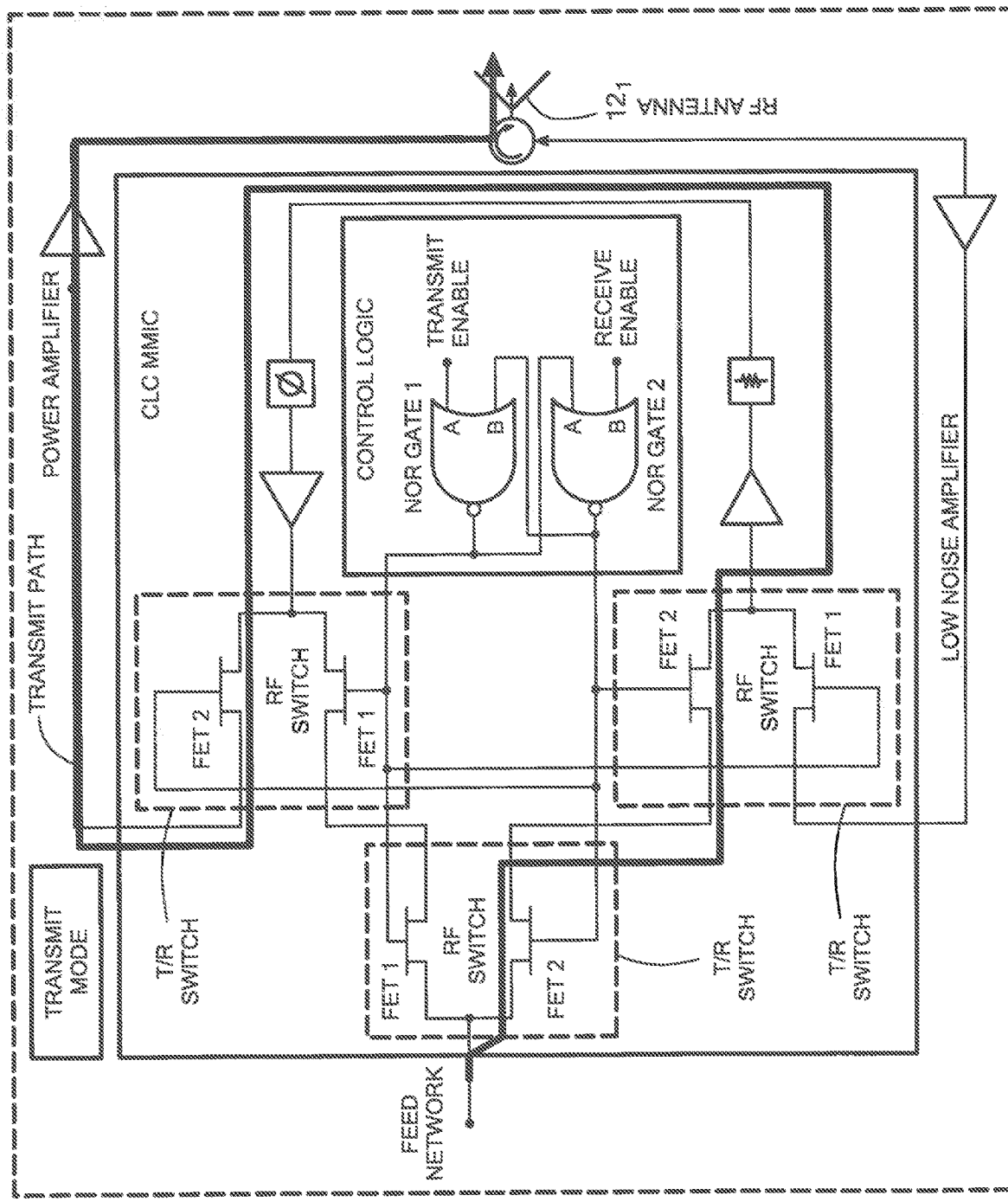
FIG. 1A is a diagrammatical sketch of a switchable T/R module used in the radar system of FIG. 1 operating in the transmit mode according to the PRIOR ART.
Figure 1B:
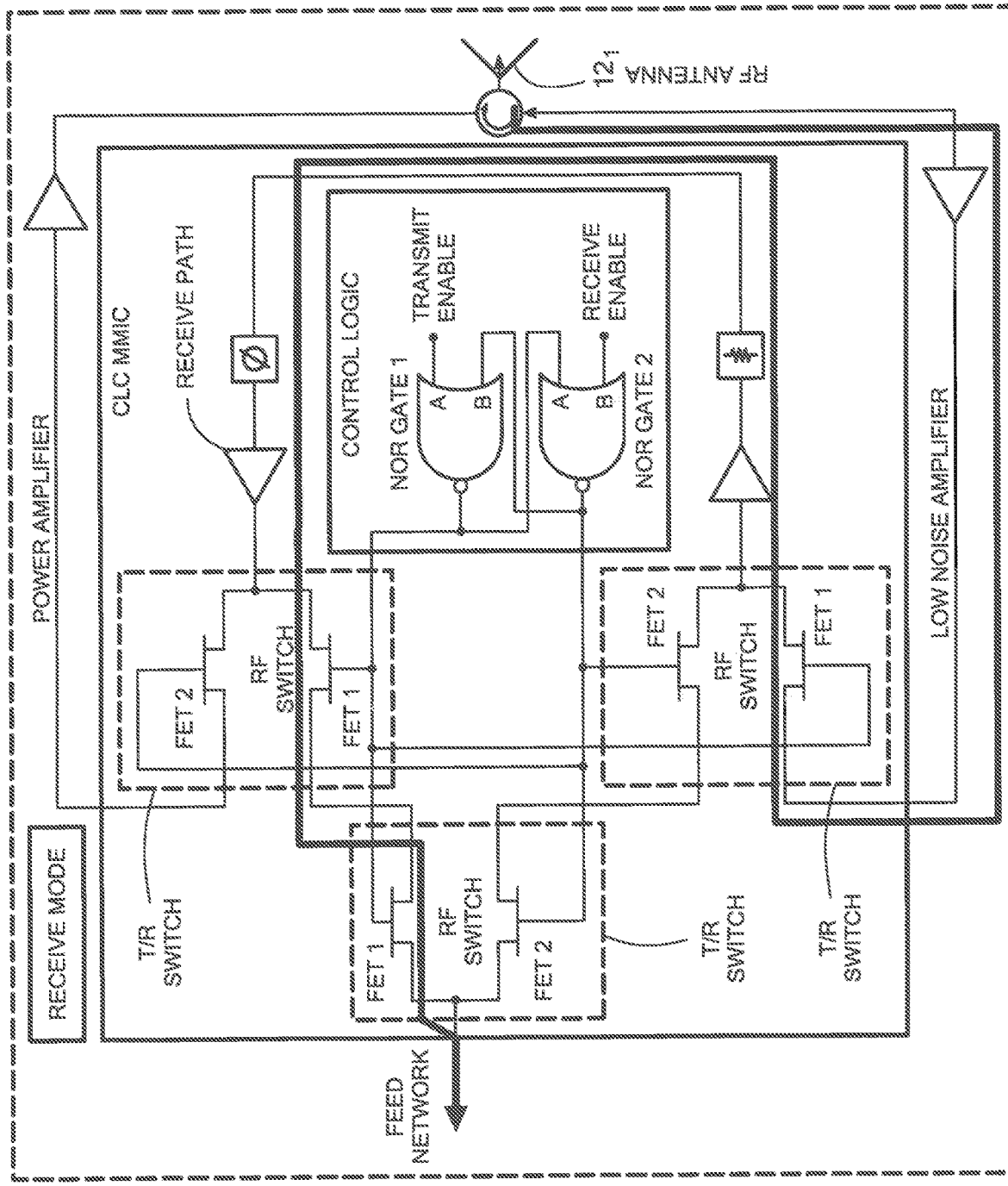
FIG. 1B is a diagrammatical sketch of a switchable T/R module used in the radar system of FIG. 1 operating in the receive mode according to the PRIOR ART.
Figure 1D:
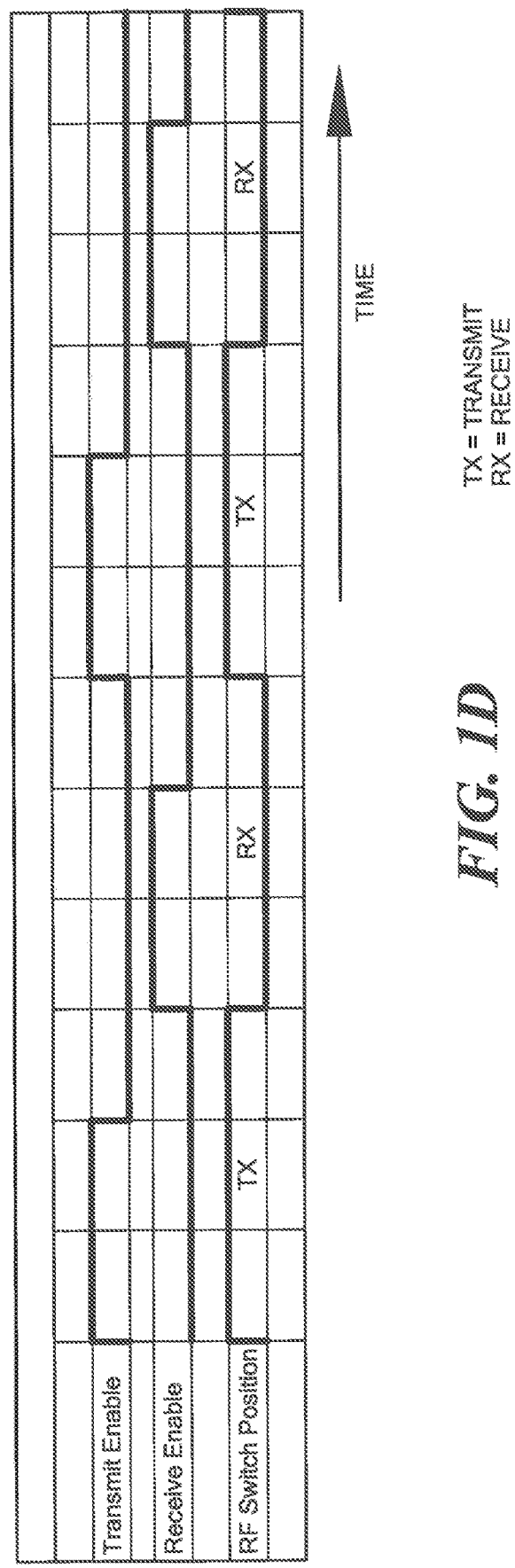
FIG. 1D is a timing diagram of the switchable T/R module of the radar system of FIG. 1 according to the PRIOR ART.

In response to a transmit enable signal provided by the system controller 22 (FIG. 1), and referring also to FIG. 3A, with the receive enable signal logic 0 and with the transmit enable signal logic 1: inverter 52, NOR gate 58, inverter 61 and inverter 63 produce logic 1 signal, while NOR gate 56, NOR gate 54, NAND gate 62, inverter NOR gate 60 and inverter 50 produces a logic 0 signal. Therefore, the logic 1 signal produced by NOR gate 58 turns the FET A of switch SW1, FET B of switch SW2 and FET B of switch SW 3 and passes RF power through the FET A of the switch SW 1 and FETs B of switchers SW 2 and SW 3 to antenna $12_1$; it being noted that the FET B of switch SW 1 and the FETs A of switches SW 2 and SW 3 are turned off by the logic 0 signal produced by NOR gate 60. It is also noted that FET C of switch SW 1 is turned off by the logic 0 produced by NAND gate 62.

Figure 3C:
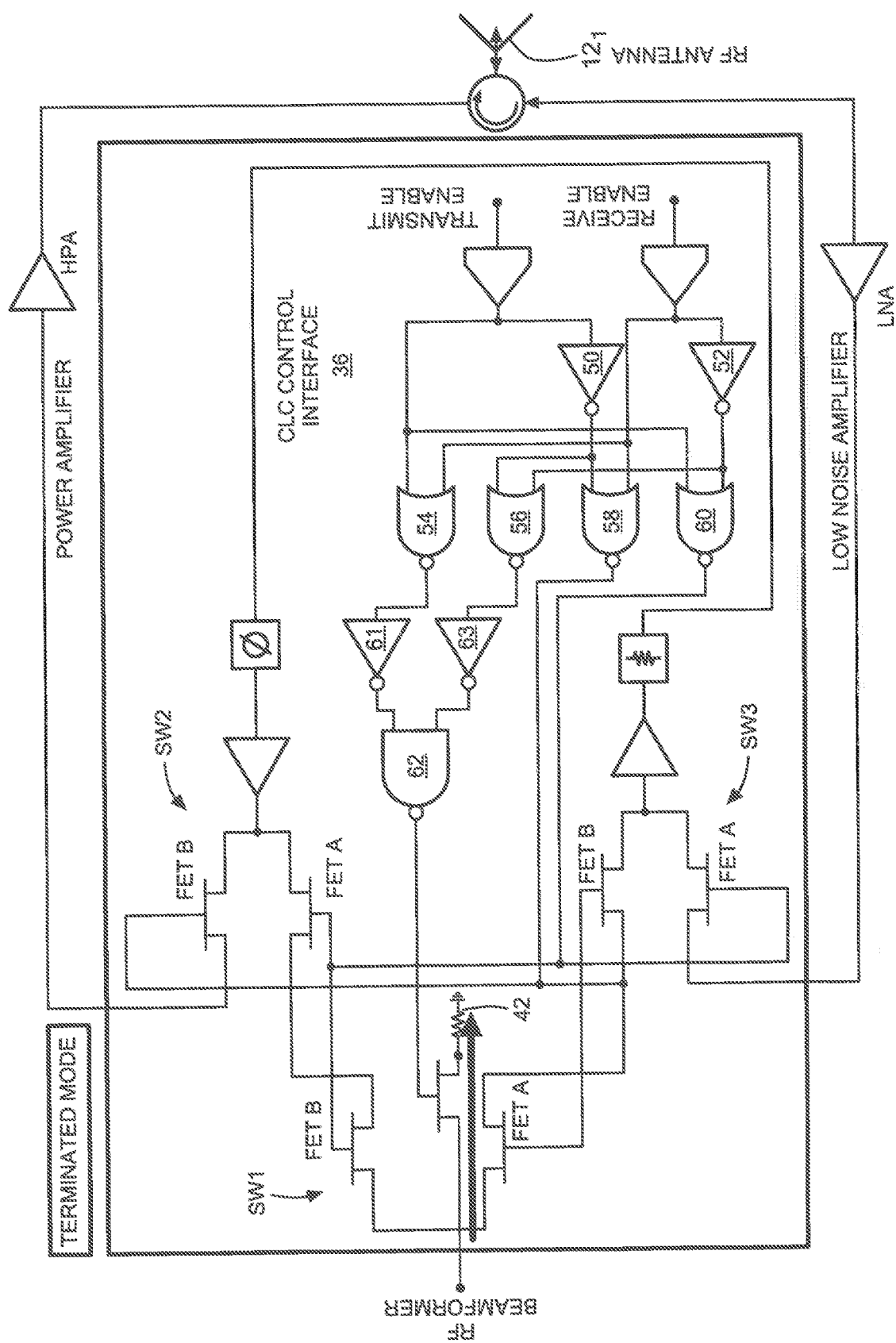
FIG. 3C is a diagrammatical sketch of a switchable T/R module used in the radar system of FIG. 1 operating in a termination mode in the absence of either a transmit mode signal or a receive mode signal according to the disclosure.
Figure 5:
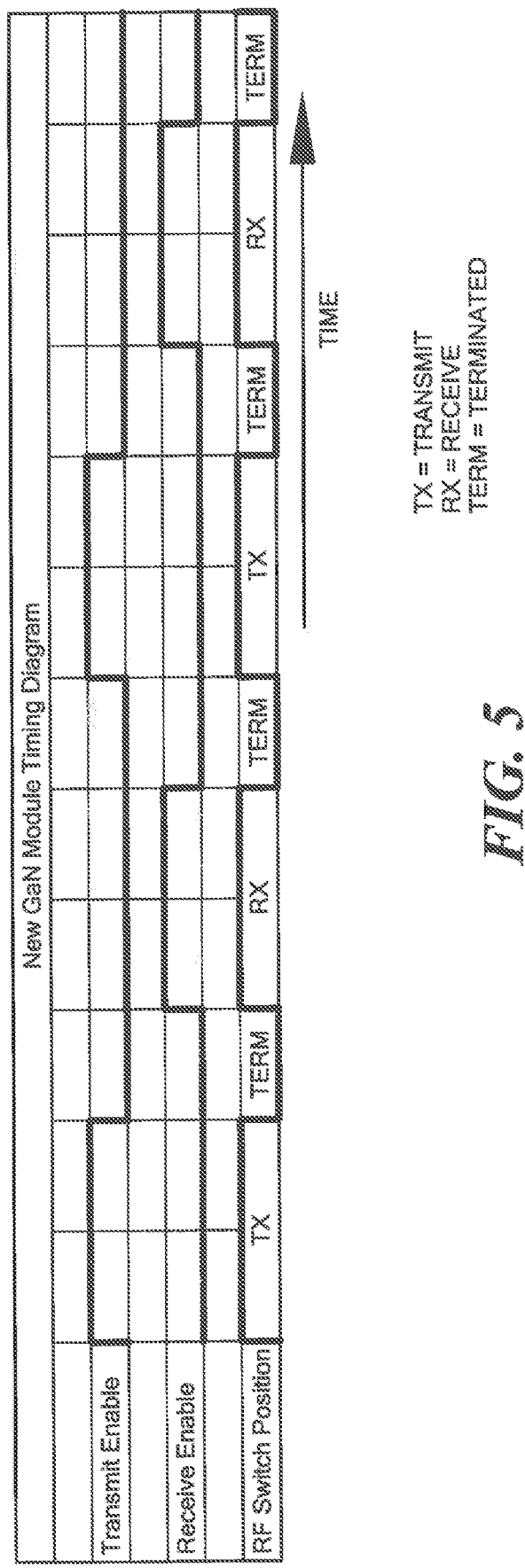
FIG. 5 is a timing diagram of the operation of the switchable T/R module of FIG. 3 according to the disclosure.

After the transmit enable logic 1 signal is returned to logic 0 and with the receive enable signal still in the logic 0 state, as shown in the timing diagram in FIG. 5 and the truth table in FIG. 4, as will described, the FETs A and B of SW 1 will be turned off and the FET C will be turned on so that the port P of switch SW 1 will be coupled to ground through the matched load 42. More particularly, and referring also to FIG. 3C, in response to a logic 0 signal on the transmit enable and a logic 0 on the receive enable, NOR gates 58 and

60, produce logic 0 signals turning FET A and FET B off in switches SW 1, SW 2 and SW 3, while NAND gate 62 produces a logic 1 signal turning FET C of switch SW 1 on so that the port P of switch SW 1 will be coupled to ground through the matched load 42.

In response to a receive enable signal provided by the system controller 22 (FIG. 1), and referring also to FIG. 3B: inverter 52, NOR gate 58, NOR gate 54, NOR gate 56 and NAND gate 62 produce logic 0 signals, while inverter 61, inverter 63, inverter 50 and NOR gate 60 produce a logic 1 signal. Therefore, the logic 1 signal produced by NOR gate 60 turns the FET B of switch SW 1 and FETs A of switches SW 2 and SW 3 and RF power passes from the antenna element 12₁ through the FET B of SW1, and FET A of SW2 and SW3 to feed network 18 (FIG. 2); it being noted that the FET A of switch SW 1 and FETs B of switches SW 2 and SW 3 are turned off by the logic 0 signal produced by NOR gate 58. It is also noted that FET C of switch SW 1 is turned off by the logic 0 produced by NAND gate 62.

A number of embodiments of the disclosure have been described. Nevertheless, it will be understood that various modifications may be made without departing from the spirit and scope of the disclosure. Accordingly, other embodiments are within the scope of the following claims.

What is claimed is:

1. A radar system, comprising:
a transmit/receive module, comprising:
a switch;
a load;
a controller for: producing a transmit enable signal to initiate a transmit mode to enable radar energy to pass to an antenna from a transmit/receiver section and a receive signal to initiate a receive mode to enable radar energy to pass from the antenna to the transmit/receiver section; and in the absence of the produced transmit mode signal and the produced receive mode signal, coupling radar energy fed to switch to the load during a time interval subsequent to the controller producing the transmit enable signal to the transmit/receive module and prior to the controller producing the receive enable signal to the transmit/receive module.

2. A radar system comprising;
a transmit/receive module, comprising:
a first switch;
a second switch;
a third switch;
a load;
a controller for operating the first switch, the second switch and the third switch to:
couple radar energy from a transmitter/receiver section of a radar system through the first switch, then to the third switch, then to the second switch and then to an antenna in response to a transmit enable signal fed to the first switch, the second switch, and the third switch to initiate a transmit mode;
couple radar signals received by the antenna through the third switch, then to the second switch, then to the first switch and then to the transmitter/receiver section of the radar system in response a receive enable signal fed to the first switch, the second switch, and the third switch to initiate a receive mode; and,
couple radar energy fed to the first switch to a load during a time interval subsequent to the transmit enable signal and prior to the receive enable signal inhibiting the energy fed to the first switch to the second switch.

3. A radar system, comprising:
a transmit/receive module, comprising:
a controllable attenuator;
a controllable phase shifter serially coupled to the controllable attenuator;
a plurality of switches; and
a controller for producing a transmit enable signal and a subsequent receive enable signal for the plurality of switches to:
couple radar energy from a transmitter, receiver section of a radar system through a first one of the plurality of switches, then to a third one of three plurality of switches, then through the serially coupled controllable attenuator and controllable phase shifter, then to a second one of the plurality of switches and then to an antenna in response to the transmit enable signal fed to the plurality of switches to initiate a transmit mode;
couple radar signals received by the antenna through the second one of the plurality of switches, then through the serially coupled controllable attenuator and controllable phase shifter, then to the third one of the plurality of switches, then to the first one of the plurality of switches and then to the transmitter/receiver section of the radar system in response the receive enable signal fed to the plurality of switches to initiate a receive mode; and,
couple radar energy fed to the first one of the plurality of switches to a load during a time interval subsequent to the transmit enable signal and prior to the receive enable signal inhibiting the energy fed to the first one of the plurality of switches from passing to the serially coupled controllable attenuator and controllable phase shifter.

4. The radar system recited in claim 3 wherein the first one of the plurality of switches has a predetermined input impedance when responding to the transmit enable signal and wherein the load has the same impedance as the predetermined input impedance.

5. The radar system recited in claim 4 including a GaN amplifier coupled to an output of the second one of the plurality of switches.

6. A radar system, comprising:
a transmit/receive module, comprising:
a switch
a load;
a controller for coupling radar energy fed to switch to the load during a time interval subsequent to the controller producing a transmit enable signal to the transmit/receive module and prior to the controller producing a receive enable signal to the transmit/receive module;
an antenna section;
a transmit section;
a receive section; and
wherein the switch has four ports, a first one of the ports being coupled to the antenna section, a second one of the ports being coupled to the transmit section; a third one of ports being coupled to the receive section and a fourth one of the ports being coupled to the load; and wherein the controller operates in the following sequence to: couple the first port to the second port during a transmit mode, decouple the first port from the second port subsequent to the transmit mode and then couple the first port to the load through the fourth port prior during a termination mode; and then; couple the first port to the second port during a receive mode subsequent to the termination mode and prior to a subsequent transit mode.

7. A method for operating a transmit/receive module, comprising:
providing a system, comprising:
switch;
a load; and
a controller;
operating the controller to produce a transmit enable signal to initiate a transmit mode to enable radar energy to pass to an antenna from a transmit/receiver section and a receive signal to initiate a receive mode to enable radar energy pass from the antenna to the transmit/receiver section; and in the absence of the produced transmit mode signal and the produced receive mode signal, coupling radar energy fed to switch to the load during a time interval subsequent to the controller producing the transmit enable signal to the transmit/receive module and prior to the controller producing the receive enable signal to the transmit/receive module.

8. A method for operating a transmit/receive module, comprising:
providing a system, comprising:
a switch;
a load; and
a controller; and
operating the controller to: couple radar energy fed to switch to the load during a time interval subsequent to the controller producing a transmit, enable signal to the transmit/receive module and prior to the controller producing a receive enable signal to the transmit/receive module; and
wherein the system includes: includes: an antenna section; a transmit section; and a receive section; and wherein the switch has four ports, a first one of the ports being coupled to the antenna section, a second one of the ports being coupled to the transmit section; a third one of ports being coupled to the receive section and a fourth one of the ports being coupled to the load; and wherein the controller operates in the following sequence to: couple the first port to the second port during a transmit mode, decouple the first port from the second port subsequent to the transmit mode and then couple the first port to the load through the fourth port prior during a termination mode; and then; couple the first port to the second port during a receive mode subsequent to the termination mode and prior to a subsequent transit mode.

* * * * *